(12) United States Patent
Hiranaka et al.

(10) Patent No.: US 11,869,355 B2
(45) Date of Patent: Jan. 9, 2024

(54) MANAGEMENT SYSTEM OF WORK SITE AND MANAGEMENT METHOD OF WORK SITE

(71) Applicant: Komatsu Ltd., Tokyo (JP)

(72) Inventors: Takashi Hiranaka, Tokyo (JP); Isao Toku, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/598,852

(22) PCT Filed: Apr. 2, 2020

(86) PCT No.: PCT/JP2020/015151
§ 371 (c)(1),
(2) Date: Sep. 27, 2021

(87) PCT Pub. No.: WO2020/204126
PCT Pub. Date: Oct. 8, 2020

(65) Prior Publication Data
US 2022/0198927 A1     Jun. 23, 2022

(30) Foreign Application Priority Data

Apr. 3, 2019  (JP) ................................ 2019-071672

(51) Int. Cl.
*G05D 1/00*  (2006.01)
*G08G 1/13*  (2006.01)
*G05D 1/02*  (2020.01)

(52) U.S. Cl.
CPC ............. *G08G 1/13* (2013.01); *G05D 1/0276* (2013.01); *G05D 2201/0202* (2013.01)

(58) Field of Classification Search
CPC ...... G08G 1/13; G08G 1/0112; G08G 1/0145; G08G 1/096708; G08G 1/20; G05D 1/0276; G05D 2201/0202; G05D 1/0297; G05D 2201/021; G05D 1/00; E02F 9/20
USPC .......................................................... 701/24
See application file for complete search history.

(56) References Cited

U.S. PATENT DOCUMENTS

| | | | |
|---|---|---|---|
| 2017/0068249 A1* | 3/2017 | Minowa | ................ H04W 4/024 |
| 2020/0064863 A1* | 2/2020 | Tomita | ................ G05D 1/0297 |

FOREIGN PATENT DOCUMENTS

| | | | |
|---|---|---|---|
| JP | 2001-228918 A | | 8/2001 |
| JP | 2016-153987 A | | 8/2016 |
| JP | 2016-218576 A | | 12/2016 |
| JP | 2016218576 A | * | 12/2016 |
| JP | 6358635 B1 | | 7/2018 |

(Continued)

OTHER PUBLICATIONS

Office Action dated May 24, 2022, issued for the corresponding Chinese patent application No. 202080026147.1.

(Continued)

*Primary Examiner* — Shardul D Patel
(74) *Attorney, Agent, or Firm* — Locke Lord LLP

(57) ABSTRACT

A management system of a work site in which an unmanned vehicle and a manned vehicle operate in a mixed manner includes: a determination unit that determines whether or not the manned vehicle exists in a predetermined area of the work site; and a command unit that outputs a work command to cause the unmanned vehicle or the manned vehicle to travel to a work point set in a work place based on the determination result.

12 Claims, 12 Drawing Sheets

(56) References Cited

FOREIGN PATENT DOCUMENTS

| | | |
|---|---|---|
| WO | 2015/151291 A1 | 10/2015 |
| WO | 2016/051524 A1 | 4/2016 |

OTHER PUBLICATIONS

Office Action dated Jun. 6, 2023, issued for Japanese patent application No. 2019-071672 and English translation thereof.

* cited by examiner

MANAGEMENT SYSTEM OF WORK SITE AND MANAGEMENT METHOD OF WORK SITE

FIELD

The present disclosure relates to a management system of a work site and a management method of a work site.

BACKGROUND

In a wide-area work site such as a mine, an unmanned vehicle may operate.

CITATION LIST

Patent Literature

Patent Literature 1: WO 2016/051524 A

SUMMARY

Technical Problem

In a work site, an unmanned vehicle and a manned vehicle may operate in a mixed manner. When each of the unmanned vehicle and the manned vehicle is a transporter vehicle, the transporter vehicle performs a loading operation and a soil discharging operation in a work place such as a loading place and a soil discharging place. In order to suppress a decrease in work efficiency, it is necessary to operate the unmanned vehicle and the manned vehicle without decreasing an operation rate of the unmanned vehicle and the manned vehicle.

Solution to Problem

According to an aspect of the present invention, a management system of a work site in which an unmanned vehicle and a manned vehicle operate in a mixed manner, the management system of the work site comprises: a determination unit that determines whether or not the manned vehicle exists in a predetermined area of the work site; and a command unit that outputs a work command to cause the unmanned vehicle or the manned vehicle to travel to a work point set in a work place based on the determination result.

Advantageous Effects of Invention

According to an aspect of the present invention, it is possible to suppress a decrease in work efficiency.

DESCRIPTION OF EMBODIMENTS

Hereinafter, embodiments according to the present disclosure will be described with reference to the drawings, but the present invention is not limited thereto. The components of the embodiments described below can be appropriately combined. In addition, some components may not be used.

Management System

Figure 1:
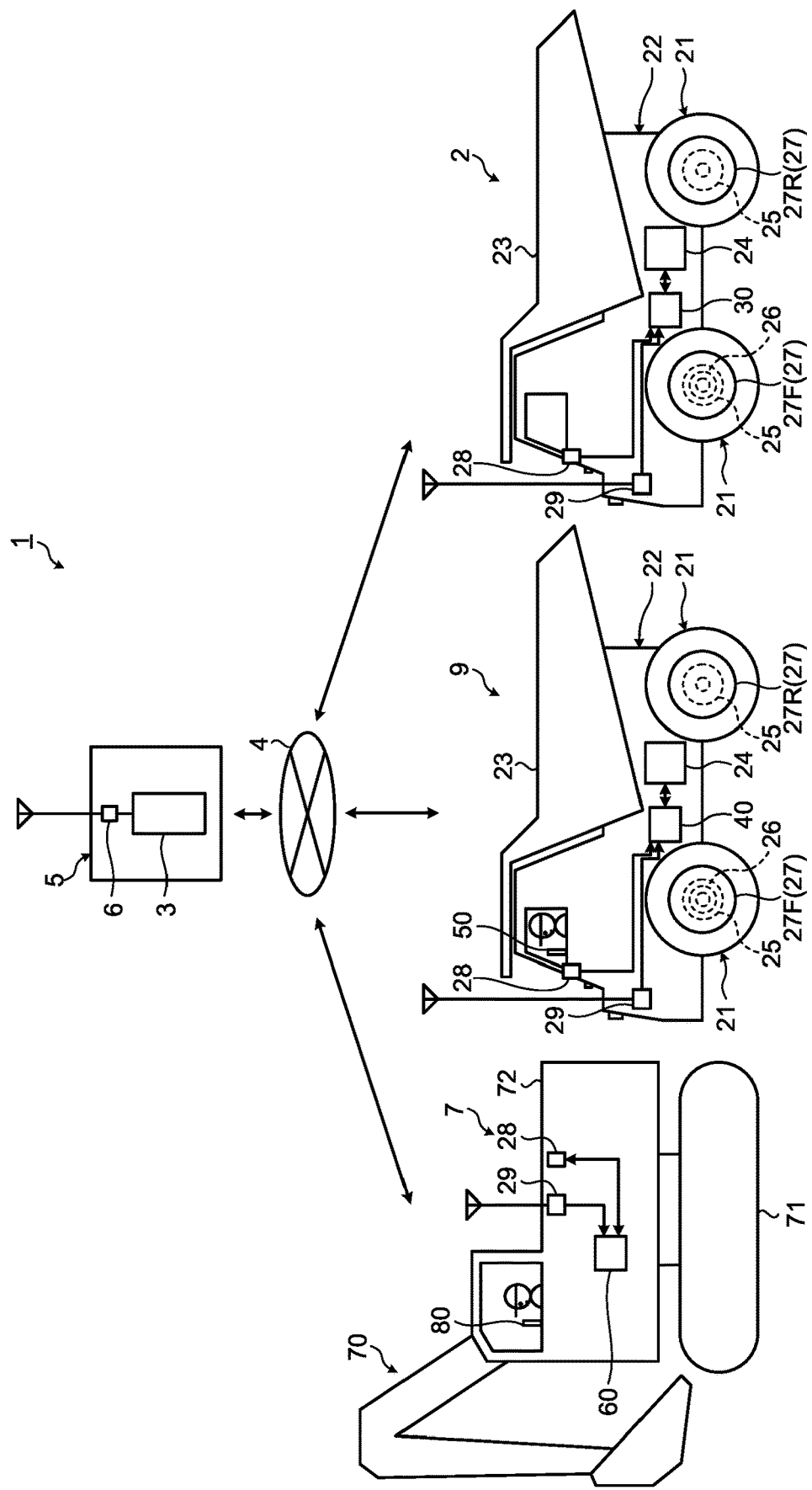
FIG. 1 is a diagram schematically illustrating an example of a management system, an unmanned vehicle, and a manned vehicle according to a present embodiment.

FIG. 1 is a diagram schematically illustrating an example of a management system 1, an unmanned vehicle 2, a manned vehicle 9, and a loader 7 according to the present embodiment. Each of the unmanned vehicle 2, the manned vehicle 9, and the loader 7 operates at a work site. In the embodiment, the work site is a mine or a quarry. The mine refers to a place or a place of business where minerals are mined.

The unmanned vehicle 2 refers to a vehicle that operates in an unmanned manner without depending on a driving operation by a driver. The manned vehicle 9 refers to a vehicle that operates by a driving operation by a driver. The loader 7 refers to a work machine that loads a load on the unmanned vehicle 2 and the manned vehicle 9.

The unmanned vehicle 2 and the manned vehicle 9 are dump trucks that are a type of transporter vehicle that travels at a work site and transports a load. The loader 7 is, for example, an excavator having working equipment including a bucket. Examples of the load transported by the unmanned vehicle 2 and the manned vehicle 9 include ore or earth and sand excavated in a mine or a quarry. Note that the loader 7 may be, for example, a rope shovel or a wheel loader having working equipment including a bucket.

Note that the work site is not limited to a mine or a quarry. The work site may be any work site where the transporter vehicle transports the load.

The management system 1 includes a management device 3, a communication system 4, the unmanned vehicle 2, the manned vehicle 9, and the loader 7. The management device 3 includes a computer system and is installed, for example, in a control facility 5 at the work site. The communication system 4 performs communication among the management device 3, the unmanned vehicle 2, the manned vehicle 9, and the loader 7. A wireless communication device 6 is connected to the management device 3. The communication system 4 includes the wireless communication device 6. The management device 3, the unmanned vehicle 2, the manned vehicle 9, and the loader 7 wirelessly communicate with each other via the communication system 4.

Unmanned Vehicle

The unmanned vehicle 2 travels at the work site based on, for example, travel course data transmitted from the management device 3. The unmanned vehicle 2 includes a traveling device 21, a vehicle body 22 supported by the traveling device 21, a dump body 23 supported by the vehicle body 22, and a control device 30.

The traveling device 21 includes a driving device 24 that drives the traveling device 21, a brake device 25 that brakes the traveling device 21, a steering device 26 that adjusts a traveling direction, and wheels 27.

When the wheels 27 rotate, the unmanned vehicle 2 self-travels. The wheels 27 include a front wheel 27F and a rear wheel 27R. Tires are mounted on the wheels 27.

The driving device 24 generates a driving force for accelerating the unmanned vehicle 2. The driving device 24 includes an internal combustion engine such as a diesel engine. Note that the driving device 24 may include an electric motor. Power generated by the driving device 24 is transmitted to the rear wheel 27R. The brake device 25 generates a braking force for decelerating or stopping the unmanned vehicle 2. The steering device 26 can adjust the traveling direction of the unmanned vehicle 2. The traveling direction of the unmanned vehicle 2 includes a direction of a front portion of the vehicle body 22. The steering device 26 adjusts the traveling direction of the unmanned vehicle 2 by steering the front wheel 27F.

The control device 30 can communicate with the management device 3 existing outside the unmanned vehicle 2. The control device 30 outputs an accelerator command to operate the driving device 24, a brake command to operate the brake device 25, and a steering command to operate the steering device 26. The driving device 24 generates the driving force for accelerating the unmanned vehicle 2 based on the accelerator command output from the control device 30. A traveling speed of the unmanned vehicle 2 is adjusted by adjusting output of the driving device 24. The brake device 25 generates the braking force for decelerating the unmanned vehicle 2 based on the brake command output from the control device 30. The steering device 26 generates a force for changing a direction of the front wheel 27F in order to cause the unmanned vehicle 2 to travel straight or turn based on the steering command output from the control device 30.

In addition, the unmanned vehicle 2 includes a position detection device 28 that detects a position of the unmanned vehicle 2. The position of the unmanned vehicle 2 is detected using a global navigation satellite system (GNSS). The global navigation satellite system includes a global positioning system (GPS). The global navigation satellite system detects an absolute position of the unmanned vehicle 2 defined by coordinate data of latitude, longitude, and altitude. The position of the unmanned vehicle 2 defined in a global coordinate system is detected by the global navigation satellite system. The global coordinate system refers to a coordinate system fixed to the earth. The position detection device 28 includes a GNSS receiver and detects an absolute position (coordinates) of the unmanned vehicle 2.

Further, the unmanned vehicle 2 includes a wireless communication device 29. The communication system 4 includes the wireless communication device 29. The wireless communication device 29 can wirelessly communicate with the management device 3.

Manned Vehicle

The manned vehicle 9 travels at the work site based on a driving operation of a driver riding in a cab of the manned vehicle 9. The manned vehicle 9 includes the traveling device 21, the vehicle body 22, the dump body 23, the driving device 24, the brake device 25, the steering device 26, the wheels 27 including the front wheel 27F and the rear wheel 27R, the position detection device 28, the wireless communication device 29, a control device 40, and a notification device 50.

The position detection device 28 of the manned vehicle 9 detects a position of the manned vehicle 9. The wireless communication device 29 of the manned vehicle 9 can wirelessly communicate with the management device 3.

The control device 40 can communicate with the management device 3 existing outside the manned vehicle 9. An accelerator pedal for operating the driving device 24, a brake pedal for operating the brake device 25, and a steering wheel for operating the steering device 26 are disposed in the cab. The accelerator pedal, the brake pedal, and the steering wheel are operated by the driver. The driving device 24 generates a driving force for accelerating the manned vehicle 9 based on an operation amount of the accelerator pedal. A traveling speed of the manned vehicle 9 is adjusted by adjusting output of the driving device 24. The brake device 25 generates a braking force for decelerating the manned vehicle 9 based on an operation amount of the brake pedal. The steering device 26 generates a force for changing the direction of the front wheel 27F to cause the manned vehicle 9 to travel straight or turn based on an operation amount of the steering wheel.

The notification device 50 is disposed in the cab. The notification device 50 operates based on notification data transmitted from the management device 3. In the present embodiment, the notification device 50 notifies a work command to be described later. Examples of the notification device 50 include a display device that displays display data and a voice output device that outputs voice. Examples of the display device include a flat panel display such as a liquid crystal display (LCD) or an organic electroluminescence display (OELD).

Loader

The loader 7 performs a loading operation based on an operation of an operator on an operation room of the loader 7. The loader 7 includes working equipment 70, a traveling body 71, a turning body 72, the position detection device 28, the wireless communication device 29, a control device 60, and an input device 80. The working equipment 70 includes a boom, an arm, and a bucket.

The control device 60 can communicate with the management device 3 existing outside the loader 7. A working lever for operating the working equipment 70, a traveling lever for operating the traveling body 71, and a turning lever for turning the turning body 72 are disposed in the operation room. The working lever, the traveling lever, and the turning lever are operated by the operator. The working equipment 70 performs an excavation operation and a dumping operation based on an operation amount of the working lever. The traveling body 71 travels and stops based on an operation amount of the traveling lever. The turning body 72 turns around a turning axis based on an operation amount of the turning lever.

The input device 80 is disposed, for example, in the operation room. The input device 80 is operated by the operator to generate input data. Examples of the input device 80 include a button, a switch, and a touch panel.

Work Site

Figure 2:
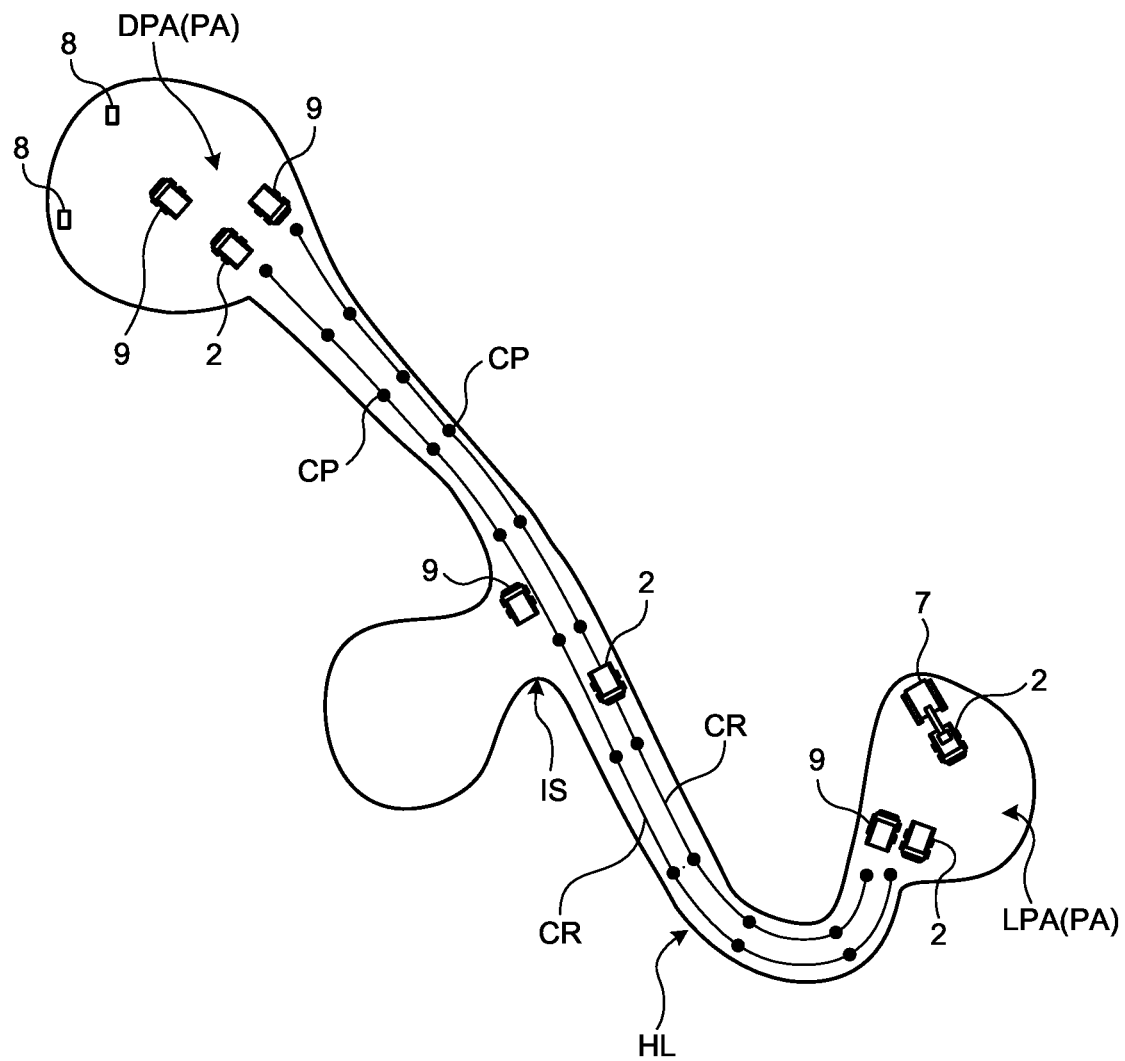
FIG. 2 is a view schematically illustrating an example of a work site according to the present embodiment.

FIG. 2 is a diagram schematically illustrating an example of a work site according to the present embodiment. The unmanned vehicle 2 and the manned vehicle 9 travel on at least a part of a work place PA in a mine and a travel path HL leading to the work place PA. The work place PA includes at least one of a loading place LPA and a soil discharging place DPA. The travel path HL includes, for example, an intersection IS.

The loading place LPA is an area in which a loading operation of loading a load on the unmanned vehicle 2 and the manned vehicle 9 is performed. The loader 7 operates in the loading place LPA. The soil discharging place DPA is an area in which a soil discharging operation of discharging a load from the unmanned vehicle 2 and the manned vehicle 9 is performed. The soil discharging place DPA is provided with, for example, a crusher 8. The crusher 8 is a work machine that crushes the load discharged from the unmanned vehicle 2 and the manned vehicle 9.

The unmanned vehicle 2 travels at the work site based on the travel course data indicating travel conditions of the unmanned vehicle 2. As illustrated in FIG. 2, the travel course data includes a plurality of course points CP set at intervals. The course points CP define target positions of the unmanned vehicle 2. A target traveling speed and a target traveling direction of the unmanned vehicle 2 are set to each of the plurality of course points CP. In addition, the travel course data includes a travel course CR indicating a target travel route of the unmanned vehicle 2. The travel course CR is defined by a line connecting the plurality of course points CP.

The travel course CR is set in the travel path HL and the work place PA. The unmanned vehicle 2 travels on the travel path HL according to the travel course CR.

The travel course data is generated by the management device 3. The management device 3 transmits the generated travel course data to the control device 30 of the unmanned vehicle 2 via the communication system 4. The control device 30 controls the traveling device 21 so that the unmanned vehicle 2 travels along the travel course CR based on the travel course data and travels according to a target traveling speed and a target traveling direction set for each of the plurality of course points CP.

In the present embodiment, the unmanned vehicle 2 and the manned vehicle 9 operate in a mixed manner on the travel path HL and in the work place PA. For example, the unmanned vehicle 2 and the manned vehicle 9 operate in a mixed manner in the loading place LPA which is a work place.

Management Device and Control Device

Figure 3:
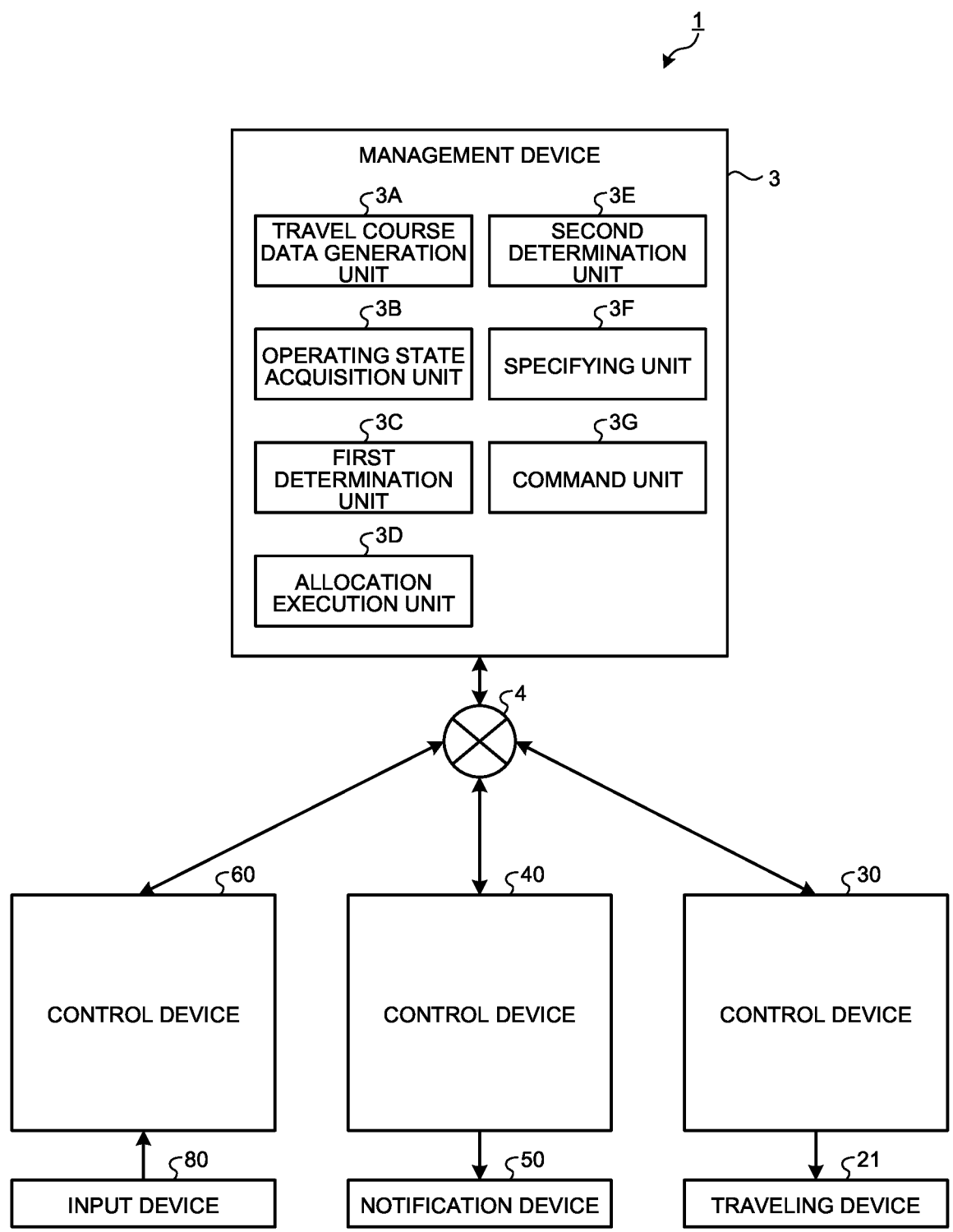
FIG. 3 is a functional block diagram illustrating an example of the management system according to the present embodiment.

FIG. 3 is a functional block diagram illustrating an example of the management system 1 according to the present embodiment. The management system 1 includes the management device 3, the control device 30, the control device 40, and the control device 60.

The management device 3 includes a travel course data generation unit 3A, an operating state acquisition unit 3B, a first determination unit 3C, an allocation execution unit 3D, a second determination unit 3E, a specifying unit 3F, and a command unit 3G.

The travel course data generation unit 3A generates travel course data including the travel course CR. The travel course data generated by the travel course data generation unit 3A is transmitted to the control device 30 of the unmanned vehicle 2.

The operating state acquisition unit 3B acquires operating states of the unmanned vehicle 2 and the manned vehicle 9 operating at the work site via the communication system 4.

The operating states of the unmanned vehicle 2 and the manned vehicle 9 include the position of the unmanned vehicle 2 and the position of the manned vehicle 9. The position of the unmanned vehicle 2 and the position of the manned vehicle 9 are detected by the position detection device 28. The operating state acquisition unit 3B can acquire the position of the unmanned vehicle 2 and the position of the manned vehicle 9 by receiving detection data of the position detection device 28.

The first determination unit 3C determines whether or not the manned vehicle 9 exists in a predetermined area of the work site. The first determination unit 3C determines whether or not the manned vehicle 9 exists in the predetermined area based on the position of the manned vehicle 9.

In the present embodiment, the first determination unit 3C determines whether or not the unmanned vehicle 2 and the manned vehicle 9 waiting for acquisition of an entry command to a loading point LP set in the loading place LPA exist in a predetermined area of the work site based on the operating states of the unmanned vehicle 2 and the manned vehicle 9 operating in the loading place LPA. The predetermined area of the work site is, for example, a predetermined area of the loading place LPA. As an example, the predetermined area refers to an area different from a standby position WP and the loading point LP of the loading place LPA like a manned vehicle 9(a), a manned vehicle 9(b), and a manned vehicle 9(c) in FIGS. 17 and 18. The first determination unit 3C determines whether or not the manned vehicle 9 exists in the predetermined area by comparing coordinates of the position of the manned vehicle 9 with coordinates of the position of the predetermined area. Note that the determination as to whether or not the manned vehicle 9 exists in the predetermined area may be made by comparing the coordinates of the position of the manned vehicle 9 with coordinates of the standby position WP and coordinates of the loading point LP of the loading place LPA. At least one loading point LP is set in the loading place LPA. In the present embodiment, two loading points LP are set. The loading points LP are work points at which a loading operation is performed by the loader 7. The first determination unit 3C determines whether or not the manned vehicle 9 waiting for acquisition of the entry command exists at the standby position WP. Note that the determination as to whether or not the manned vehicle 9 exists at the standby position WP may be made by comparing the coordinates of the position of the manned vehicle 9 with the coordinates of the standby position WP of the loading place LPA. The first determination unit 3C includes existence of the manned vehicle 9 waiting for acquisition of the entry command to the loading point LPA. Similarly, the first determination unit 3C determines whether or not the unmanned vehicle 2 exists in the predetermined area by comparing the coordinates of the position of the unmanned vehicle 2 with the coordinates of the position of the predetermined area.

The allocation execution unit 3D allocates the unmanned vehicle 2 or the manned vehicle 9 existing in the predetermined area to at least one loading point LP set in the loading place LPA based on a determination result of the first determination unit 3C. In addition, when the unmanned vehicle 2 or manned vehicle 9 waiting for acquisition of the entry command does not exist at the standby position WP set in the loading place LPA, the allocation execution unit 3D allocates the loading point LPA to the unmanned vehicle 2 or the manned vehicle 9 waiting at an entrance of the loading place LPA. The allocation execution unit 3D allocates the loading point LP to the manned vehicle 9 existing in the predetermined area in preference to the unmanned vehicle 2 or the manned vehicle 9 waiting at the entrance of the loading place LPA.

The second determination unit 3E receives the input data of the input device 80 provided in the loader 7 via the communication system 4. The operator of the loader 7 operates the input device 80 to generate input data for causing the unmanned vehicle 2 or the manned vehicle 9 to enter the loading point LP and input data for causing the unmanned vehicle 2 or the manned vehicle 9 to leave the loading point LP. The second determination unit 3E determines whether or not to cause the unmanned vehicle 2 or the manned vehicle 9 to enter the loading point LP based on the input data of the input device 80 and an allocation result. The second determination unit 3E determines whether or not to cause the unmanned vehicle 2 or the manned vehicle 9 to leave the loading point LP based on the input data of the input device 80 and the allocation result.

The specifying unit 3F specifies either the unmanned vehicle 2 or the manned vehicle 9 as the transporter vehicle at the work site. The specifying unit 3F specifies either the unmanned vehicle 2 or the manned vehicle 9 as the transporter vehicle based on vehicle data of the unmanned vehicle 2 or the manned vehicle 9. Each vehicle of the unmanned vehicle 2 or the manned vehicle 9 includes information that can determine whether the vehicle is the unmanned vehicle 2 or the manned vehicle 9 as the vehicle data. For example, a vehicle A is registered in advance as a manned vehicle, a vehicle B is registered as an unmanned vehicle, and the like in association with information of the vehicle of the manned vehicle or the unmanned vehicle. The specifying unit 3F specifies either the unmanned vehicle 2 or the manned vehicle 9 as the transporter vehicle based on the information that can determine whether the vehicle is the unmanned vehicle 2 or the manned vehicle 9. Note that another method may be used as long as the information for specifying the vehicle is associated with the information for specifying whether the vehicle is the unmanned vehicle 2 or the manned vehicle 9.

The command unit 3G outputs a work command to cause the unmanned vehicle 2 or the manned vehicle 9 to travel to the loading point LP or the standby position WP set in the loading place LPA based on the determination result of the first determination unit 3C. In addition, the command unit 3G outputs the work command to the unmanned vehicle 2 or the manned vehicle 9 based on the input data from the input device 80 of the loader 7. The command unit 3G outputs the work command to the unmanned vehicle 2 or the manned vehicle 9 based on the determination result of the second determination unit 3E. In addition, the command unit 3G outputs an allocation command to the unmanned vehicle 2 or the manned vehicle 9 based on the allocation result of the allocation execution unit 3D. The command unit 3G outputs a work command to cause the unmanned vehicle 2 or the manned vehicle 9 to travel to a work point which is a predetermined stop position based on a specification result of the specifying unit 3F. The work point that is the stop position is, for example, the loading point LP.

The work command output to the unmanned vehicle 2 includes a command to cause the unmanned vehicle 2 to travel. The work command output to the manned vehicle 9 includes guidance data to be output by the notification device 50 of the manned vehicle 9.

The command to cause the unmanned vehicle 2 to travel is, for example, an entry command to cause the unmanned vehicle 2 to enter the loading point LP, an entry command to cause the unmanned vehicle 2 to enter the standby position WP, a leaving command to cause the unmanned vehicle 2 to leave the loading point LP, or the like.

The allocation command output to the unmanned vehicle 2 is, for example, the entry command to cause the unmanned vehicle 2 to enter the loading point LP, the entry command to cause the unmanned vehicle 2 to enter the standby position WP, the leaving command to cause the unmanned vehicle 2 to leave the loading point LP, or the like.

The guidance data output by the notification device 50 of the manned vehicle 9 is, for example, entry guidance data for notifying the entry command to cause the manned vehicle 9 to enter the loading point LP, entry guidance data for causing the manned vehicle 9 to enter the standby position WP, leaving guidance data for notifying the leaving command to cause the manned vehicle 9 to leave the loading point LP, or the like.

The allocation command output to the manned vehicle 9 includes allocation guidance data for notifying the allocation command. The allocation guidance data is, for example, data that can recognize a work point that is the loading point LP or the standby position WP to which the driver who drives the manned vehicle should enter.

The command unit 3G transmits the work command to the unmanned vehicle 2 and the manned vehicle 9 via the communication system 4. The command unit 3G transmits the allocation command to the unmanned vehicle 2 and the manned vehicle 9 via the communication system 4.

The control device 30 acquires the travel course data of the unmanned vehicle 2 transmitted from the travel course data generation unit 3A and controls traveling of the unmanned vehicle 2. The control device 30 controls the traveling device 21 of the unmanned vehicle 2 so that the unmanned vehicle 2 travels according to the travel course data. In addition, the control device 30 controls the traveling of the unmanned vehicle 2 based on the work command transmitted from the command unit 3G.

The control device 40 controls the notification device 50 based on the allocation command or the work command transmitted from the command unit 3G. The notification device 50 operates based on the allocation command or the work command output from the command unit 3G. As described above, the allocation command output to the manned vehicle 9 includes the allocation guidance data for notifying the allocation command. The work command output to the manned vehicle 9 is the entry guidance data for causing the manned vehicle 9 to enter the loading point LP, the entry guidance data for causing the manned vehicle 9 to enter the standby position WP, the leaving guidance data for causing the manned vehicle 9 to leave the loading point LP, or the like. The control device 40 controls the notification device 50 so that the allocation guidance data, the entry guidance data, and the leaving guidance data are output from the notification device 50. The notification device 50 notifies the allocation guidance data, the entry guidance data, and the leaving guidance data.

The control device 60 transmits the input data generated by operating the input device 80 to the management device 3.

Operation in Loading Place

Figure 4:
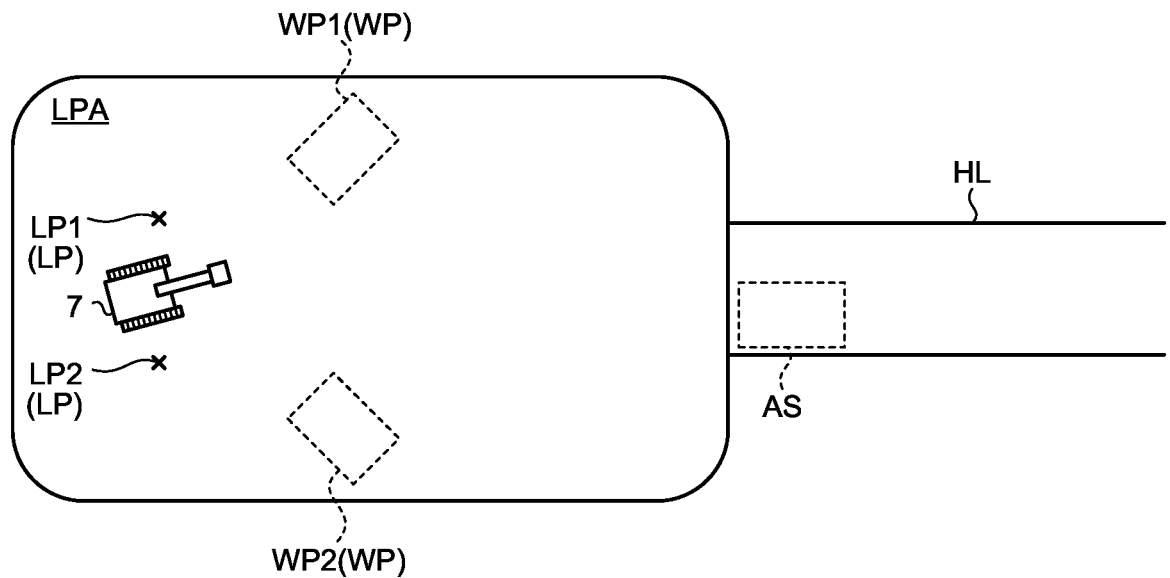
FIG. 4 is a diagram schematically illustrating an example of a loading place according to the present embodiment.

FIG. 4 is a diagram schematically illustrating an example of the loading place LPA according to the present embodiment. As illustrated in FIG. 4, the loader 7 operates in the loading place LPA. The loading point LP where a loading operation by the loader 7 is performed is set in the loading place LPA. In the present embodiment, the loading point LP includes a first loading point LP1 as a first work point and a second loading point LP2 as a second work point. The first loading point LP1 is set on one side of the loader 7. The second loading point LP2 is set on another side of the loader 7. After a first loading operation on the unmanned vehicle 2 or the manned vehicle 9 existing at the first loading point LP1 is completed, the loader 7 executes a second loading operation on the unmanned vehicle 2 or the manned vehicle 9 existing at the second loading point LP2. After the second loading operation on the unmanned vehicle 2 or the manned vehicle 9 existing at the second loading point LP2 is completed, the first loading operation on the unmanned vehicle 2 or the manned vehicle 9 that has entered the first loading point LP1 after the first loading operation has been completed is executed. That is, after completion of one loading operation of the first loading operation and the second loading operation, the loader 7 executes another loading operation, and repeats the first loading operation and the second loading operation, that is, executes a so-called both-side loading operation.

In addition, the standby position WP for waiting for acquisition of the entry command is set in the loading place LPA. In the present embodiment, the standby position WP includes a first standby position WP1 and a second standby position WP2. The first loading point LP1 is associated with the first standby position WP1, and the second loading point LP2 is associated with the second standby position WP2. The unmanned vehicle 2 or the manned vehicle 9 to which the allocation command has been output waits at the standby position WP. The unmanned vehicle 2 or the manned vehicle 9 waits for acquisition of the entry command at the standby position WP.

Further, an entry standby position AS for waiting for acquisition of the allocation command is set at the entrance of the loading place LPA. The entry standby position AS is set in a part of the travel path HL. Note that the entry standby position AS may be set inside the loading place LPA. The unmanned vehicle 2 or the manned vehicle 9 waits for acquisition of the allocation command at the entry standby position AS.

The allocation execution unit 3D executes allocation processing for allocating the loading point LP to be entered between the first loading point LP1 and the second loading point LP2 to the unmanned vehicle 2 or the manned vehicle 9 waiting for acquisition of the allocation command at the entry standby position AS.

The first determination unit 3C determines whether or not the unmanned vehicle 2 or the manned vehicle 9 waiting for acquisition of the entry command exists at the standby position WP. When it is determined that the unmanned vehicle 2 or the manned vehicle 9 waiting for acquisition of the entry command does not exist at the standby position WP, the allocation execution unit 3D executes the allocation processing. When the unmanned vehicle 2 or the manned vehicle 9 is waiting at the entry standby position AS, the allocation execution unit allocates the unmanned vehicle 2 or the manned vehicle 9 to the first work point LP1 or the second work point LP2. As an example, in a case where another vehicle (the unmanned vehicle 2 or the manned vehicle 9) exists at the second work point LP2 and the manned vehicle 9 is waiting at the entry standby position AS, the allocation execution unit 3D allocates the manned vehicle 9 to the first work point LP1. When the allocation processing is executed, the command unit 3G outputs the allocation command to the manned vehicle 9 based on the result of the allocation processing.

When the allocation command is output to the manned vehicle 9, the control device 40 of the manned vehicle 9 controls the notification device 50 based on the allocation command transmitted from the command unit 3G. The control device 40 controls the notification device 50 so that the allocation guidance data for notifying the allocation command is output.

Figure 5:
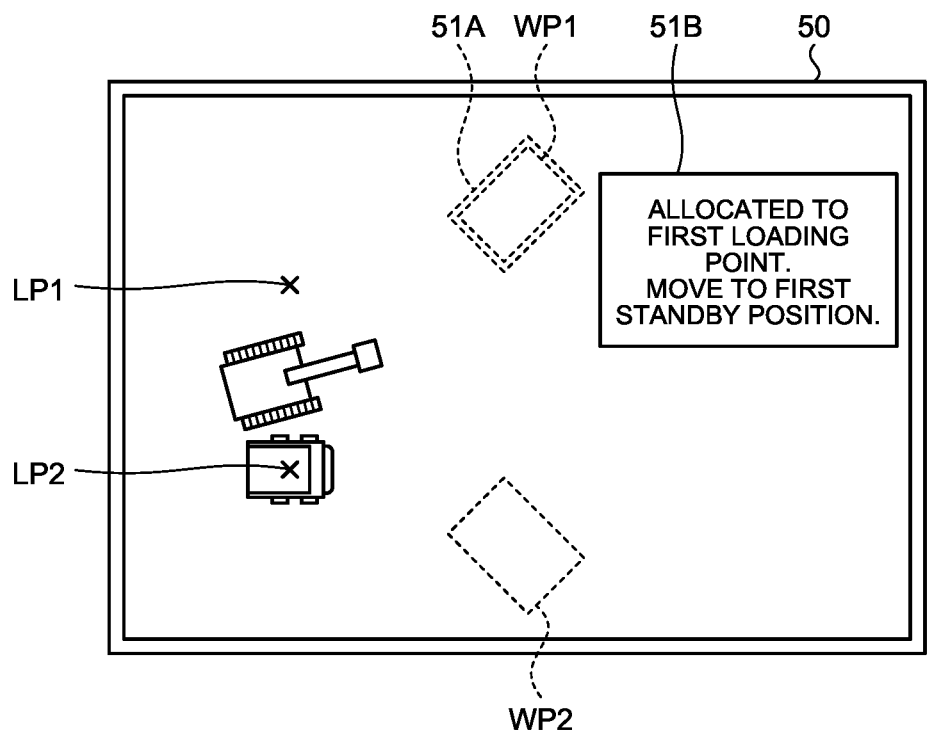
FIG. 5 is a diagram schematically illustrating an example of a notification device according to the present embodiment.

FIG. 5 is a diagram schematically illustrating an example of the notification device 50 according to the present embodiment. FIG. 5 illustrates an example in which the allocation command to cause the manned vehicle 9 to travel to the first work point LP1 is output. When the notification device 50 includes the display device, the allocation guidance data for causing the manned vehicle 9 to enter the first work point LP1 is displayed on the display device as display data. In the example illustrated in FIG. 5, an icon 51A indicating the first standby position WP1 is displayed, and character data 51B for causing the manned vehicle 9 to travel to the first standby position WP1 is displayed. Note that FIG. 5 is an example. Another display method may be used as long as the driver of the manned vehicle 9 can be notified that the manned vehicle 9 should travel to the first work point LP1. In a case where the notification device 50 includes a voice output device, notification may be performed by voice.

Note that in the example illustrated in FIG. 5, the display data of the allocation guidance data includes a symbol representing the loader 7, a symbol indicating that the unmanned vehicle 2 or the manned vehicle 9 exists at the loading point LP, a broken line which is a mark indicating that the standby positions WP exist at two places, and a double broken line which is a mark indicating the standby position WP to which the unmanned vehicle 2 or the manned vehicle 9 should travel. The mark indicating the standby position WP to which the unmanned vehicle 2 or the manned vehicle 9 should travel is in a display form different from another standby position WP, and note that the mark indicating the standby position WP in the display data may be a mark in which a front-rear direction of the unmanned vehicle 2 or the manned vehicle 9 can be known.

The second determination unit 3E executes entry determination processing for determining whether or not to cause the unmanned vehicle 2 or the manned vehicle 9 waiting for acquisition of the entry command at the standby position WP to enter the allocated loading point LP between the first loading point LP1 and the second loading point LP2.

As an example, when the manned vehicle 9 to which the first work point LP1 is allocated waits at the standby position WP, the second determination unit 3E determines whether or not to cause the manned vehicle 9 to enter the first work point LP1 based on the input data of the input device 80. For example, when it is determined that another vehicle that has been performing the loading operation at the first work point LP1 has left the first work point LP1 based on the input data of the input device 80, the second determination unit 3E determines to cause the manned vehicle 9 to enter the first work point LP1. The command unit 3G outputs the entry command to the manned vehicle 9 based on the result of the entry determination processing by the second determination unit 3E.

When the entry command is output to the manned vehicle 9, the control device 40 of the manned vehicle 9 controls the notification device 50 based on the entry command transmitted from the command unit 3G. The control device 40 controls the notification device 50 such that the entry guidance data for causing the manned vehicle 9 to enter the allocated loading point LP is output.

Figure 6:
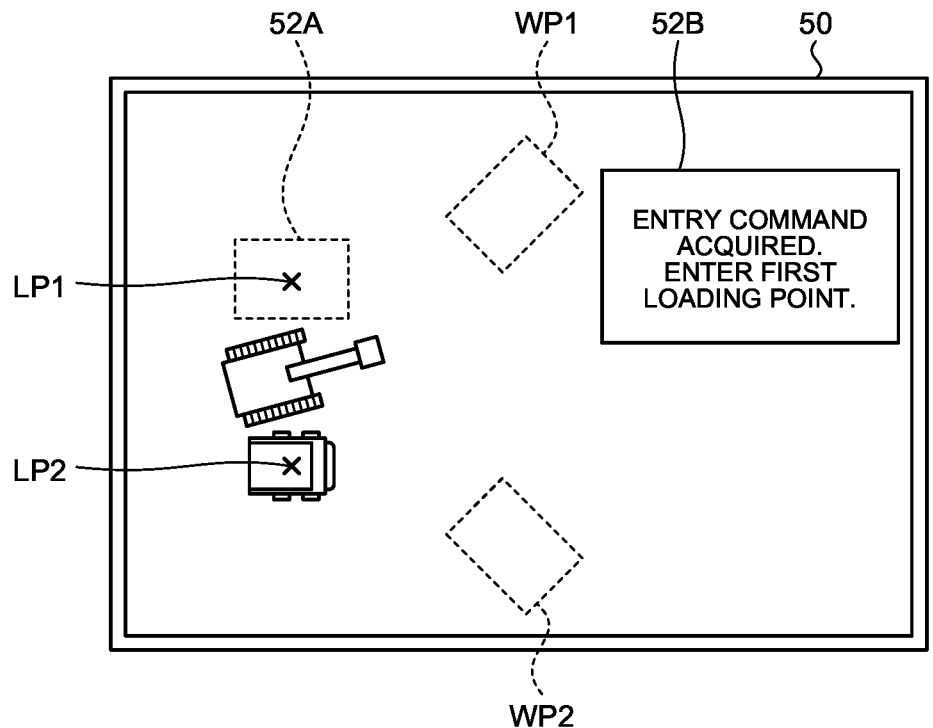
FIG. 6 is a diagram schematically illustrating an example of the notification device according to the present embodiment.

FIG. 6 is a diagram schematically illustrating an example of the notification device 50 according to the present embodiment. FIG. 6 illustrates an example in which the entry command to cause the manned vehicle 9 to enter the first loading point LP1 has been output. When the notification device 50 includes the display device, the entry guidance data for causing the manned vehicle 9 to enter the first loading point LP1 is displayed on the display device as display data. In the example illustrated in FIG. 6, an icon 52A indicating the first loading point LP1 is displayed, and character data 52B for causing the manned vehicle 9 to enter the first loading point LP1 is displayed. FIG. 6 is an example. Another display method may be used as long as the driver of the manned vehicle 9 can be notified that the manned vehicle 9 should enter the first loading point LP1. In a case where the notification device 50 includes a voice output device, notification may be performed by voice.

Note that, in the examples illustrated in FIGS. 5 and 6, a symbol which is a display form representing the loader 7, a symbol which is a display form indicating that the unmanned vehicle 2 or the manned vehicle 9 exists at the loading point LP, a broken line which is a display form indicating the standby position WP, a double broken line which is a display form indicating the loading point LP to which the unmanned vehicle 2 or the manned vehicle 9 should travel, and the like are displayed on the display device together with the character data 51B and the character data 52B which function as guidance. Note that the display form indicating the standby position WP may be a display form in which the front-rear direction of the unmanned vehicle 2 or the manned vehicle 9 can be known.

In a case where the notification device 50 includes a display device, leaving guidance data for causing the manned vehicle 9 to leave the second loading point LP2 is displayed on the display device as display data. In a case where the notification device 50 includes a voice output device, notification may be performed by voice. In a case where the notification device 50 includes a light emitting device such as a lamp, the notification may be performed by light.

Management Method

FIGS. 7 to 13 are schematic diagrams illustrating an example of a management method according to the present embodiment. FIG. 14 is a flowchart illustrating an example of the management method according to the present embodiment.

Figure 7:
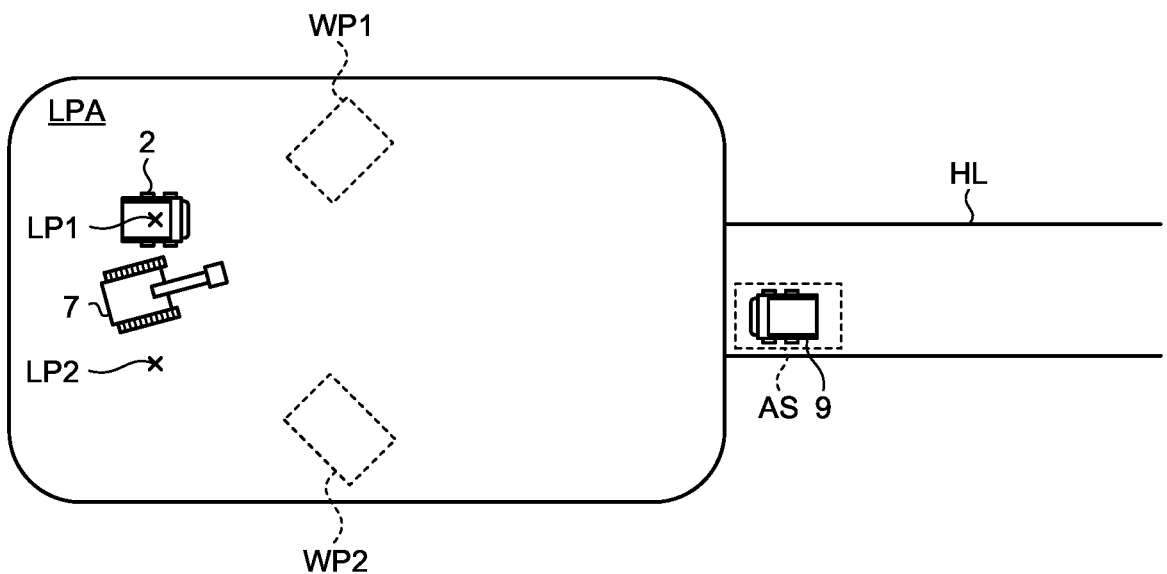
FIG. 7 is a schematic diagram illustrating an example of a management method according to the present embodiment.

As illustrated in FIG. 7, it is assumed that a loading operation of the unmanned vehicle 2 is executed at the first loading point LP1 and the manned vehicle 9 is waiting at the entry standby position AS. The specifying unit 3F specifies that the vehicle waiting at the entry standby position AS is a manned vehicle.

The first determination unit 3C determines whether or not the unmanned vehicle 2 or the manned vehicle 9 waiting for acquisition of the entry command exists at the standby position WP (Step S1).

In Step S1, when it is determined that the unmanned vehicle 2 or the manned vehicle 9 waiting for acquisition of the entry command exists at all the standby positions WP (Step S1: Yes), the allocation processing is not executed.

In Step S1, when it is determined that the unmanned vehicle 2 or the manned vehicle 9 waiting for acquisition of the entry command does not exist at at least one standby position WP (Step S1: No), the allocation execution unit 3D executes the allocation processing for the manned vehicle 9 waiting at the entry standby position AS (Step S2).

The allocation execution unit 3D allocates the manned vehicle 9 to the second loading point LP2 where no transporter vehicle exists at the loading point. The command unit 3G outputs the allocation command to the manned vehicle 9 waiting at the entry standby position AS (Step S3). After the allocation command is output, the notification device 50 of the manned vehicle 9 outputs the allocation guidance data as described with reference to FIG. 5.

Figure 8:
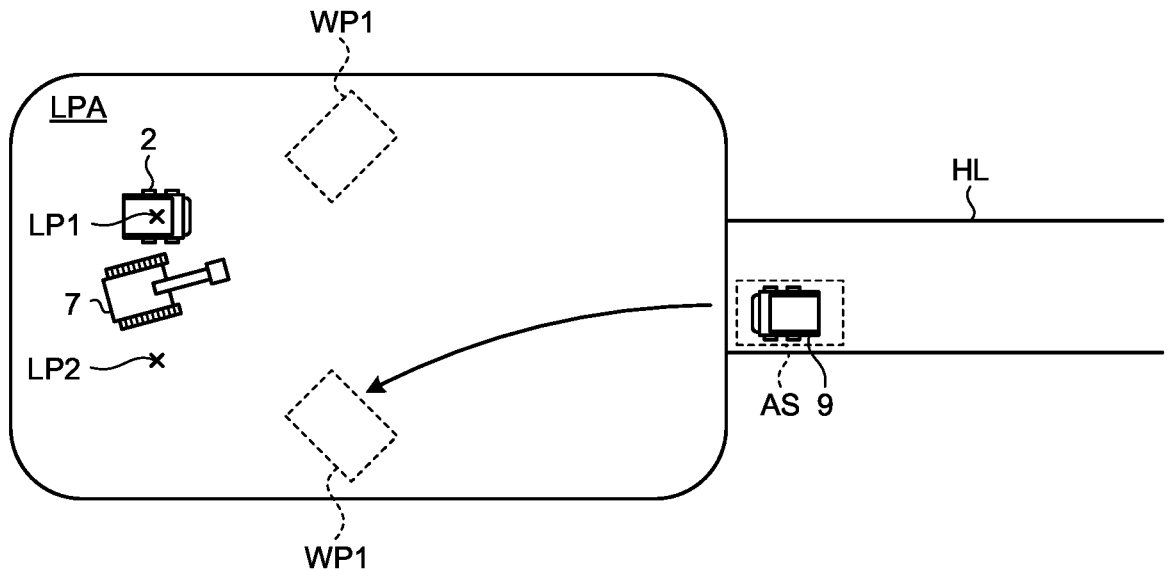
FIG. 8 is a schematic diagram illustrating an example of the management method according to the present embodiment.
Figure 9:
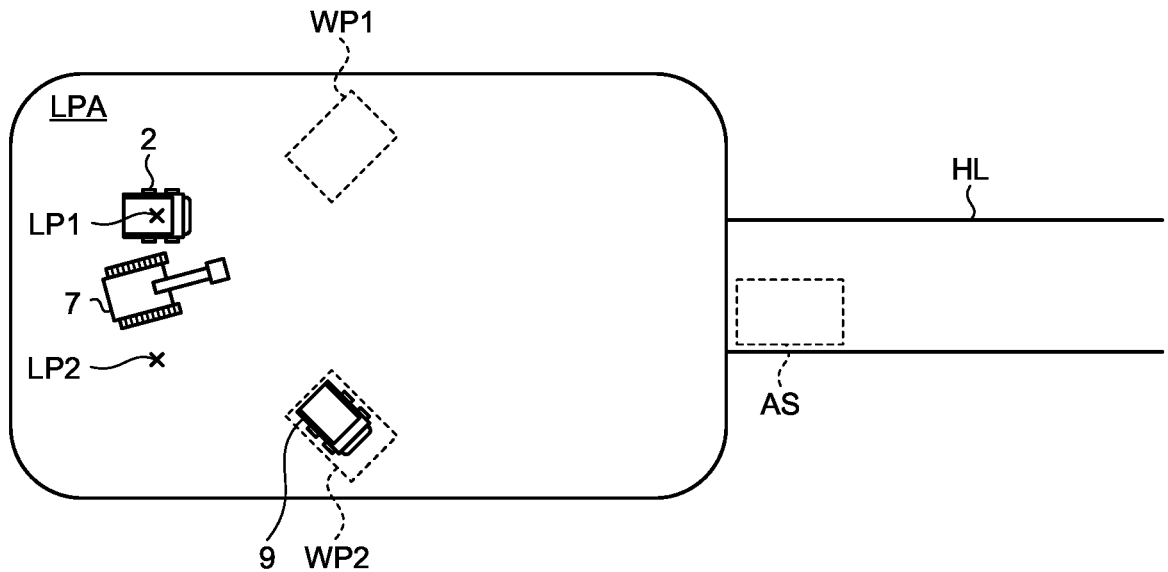
FIG. 9 is a schematic diagram illustrating an example of the management method according to the present embodiment.

As illustrated in FIG. 8, the driver of the manned vehicle 9 grasps the standby position WP to which the manned vehicle 9 should move by the allocation command, and moves the manned vehicle 9 to the second standby position WP2. As illustrated in FIG. 9, the manned vehicle 9 waits at the second standby position WP2.

A driver of the loader 7 operates the input device 80 to cause the manned vehicle 9 waiting at the second standby position WP2 to enter the second loading point LP2. Examples of the input device 80 include a button, a switch, and a touch panel. The driver operates at least one of a button, a switch, and a touch panel to cause the manned vehicle 9 to enter the second loading point LP2.

The driver of the loader 7 can cause the manned vehicle 9 to enter the second loading point LP2 before causing the unmanned vehicle 2 existing at the first loading point LP1 to leave the first loading point LP1.

The second determination unit 3E determines whether or not to cause the manned vehicle 9 to enter the second loading point LP2 based on the input data of the input device 80 (Step S4).

In this case, the driver of the loader 7 can cause the manned vehicle 9 to enter after confirming, for example, that no load exists in the dump body 23, that no obstacle exists in front of the manned vehicle 9 that enters, and the like.

In Step S4, when it is determined that the manned vehicle 9 is not caused to enter the second loading point LP2 (Step S4: No), no entry command is output.

In Step S4, when it is determined to cause the manned vehicle 9 to enter the second loading point LP2 (Step S4: Yes), the command unit 3G outputs the entry command to the manned vehicle 9 waiting at the second standby position WP2 (Step S5).

The second loading point LP2 is allocated to the manned vehicle 9 waiting at the second standby position WP2. When the entry command is output, the notification device 50 of the manned vehicle 9 outputs the entry guidance data indicating that the vehicle should enter the second loading point LP2 as described with reference to FIG. 6.

Figure 10:
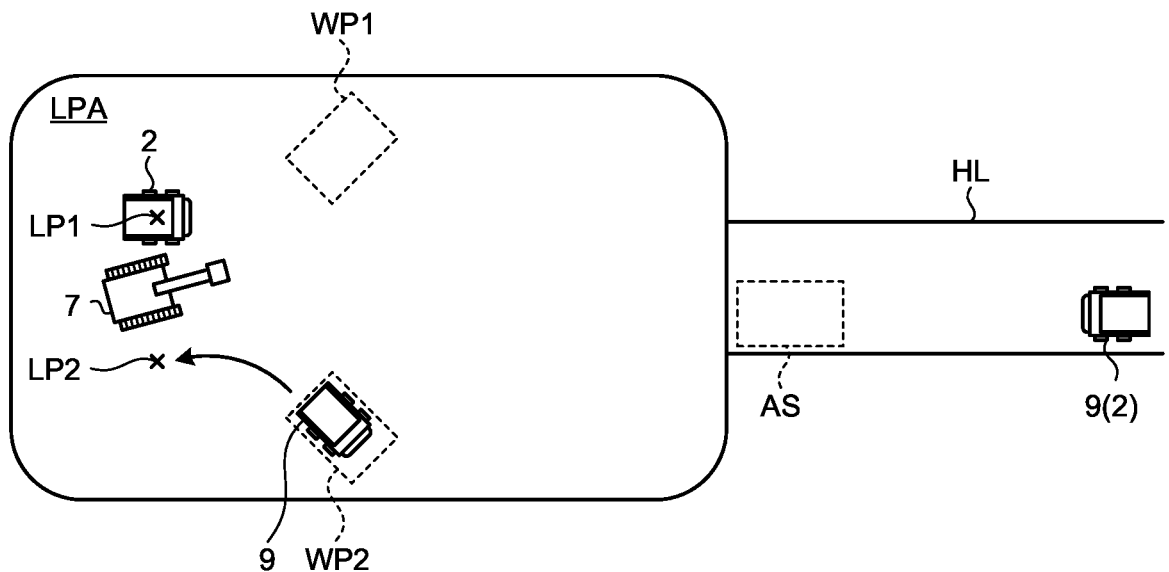
FIG. 10 is a schematic diagram illustrating an example of the management method according to the present embodiment.
Figure 11:
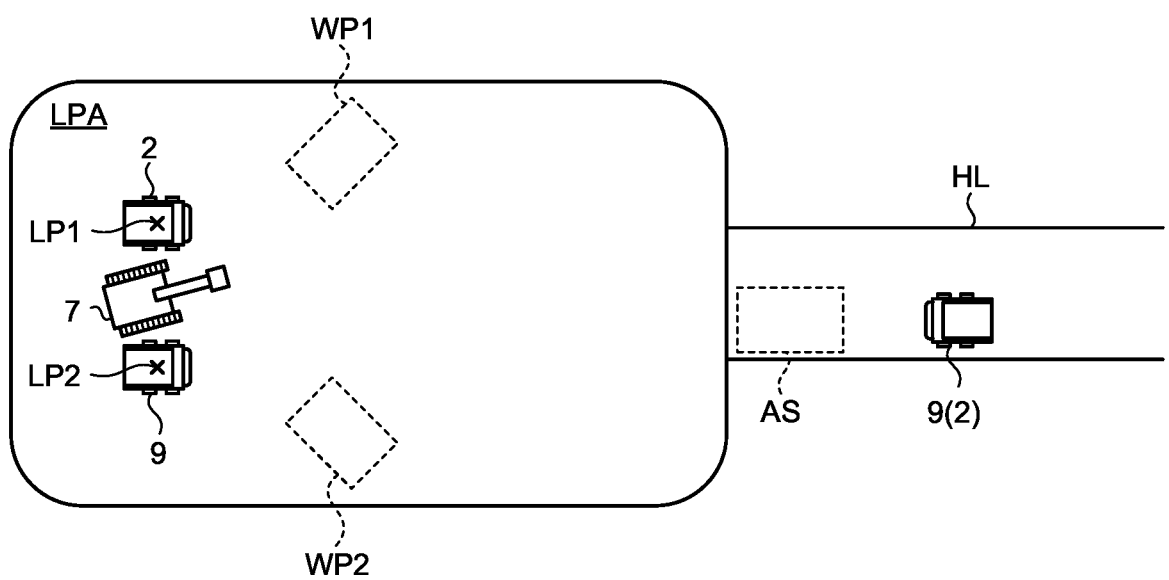
FIG. 11 is a schematic diagram illustrating an example of the management method according to the present embodiment.

As illustrated in FIG. 10, the driver of the manned vehicle 9 causes the manned vehicle 9 to enter the second loading point LP2. As illustrated in FIG. 11, the manned vehicle 9 enters the second loading point LP2 before the loading operation on the unmanned vehicle 2 at the first loading point LP1 is completed. Since the transporter vehicle is disposed at the second loading point LP2 during the execution of the loading operation on the transporter vehicle at the first loading point LP1, the loading operation on the transporter vehicle at the second loading point LP2 is immediately executed after completion of the loading operation on the transporter vehicle at the first loading point LP1. This suppresses a decrease in productivity at the work site.

After the loading operation on the unmanned vehicle 2 at the first loading point LP1 is completed, the driver of the loader 7 operates the input device 80 in order to cause the unmanned vehicle 2 to leave the first loading point LP1.

The second determination unit 3E determines whether or not to cause the unmanned vehicle 2 to leave the first loading point LP1 based on the input data of the input device 80 (Step S6).

In this case, the driver of the loader 7 can cause the unmanned vehicle 2 to leave after confirming, for example, that a load has been loaded on the dump body 23, that there is no obstacle in front of the unmanned vehicle 2 that leaves, and the like.

In Step S6, when it is determined that the unmanned vehicle 2 is not caused to leave the first loading point LP1 (Step S6: No), no leaving command is output.

Figure 12:
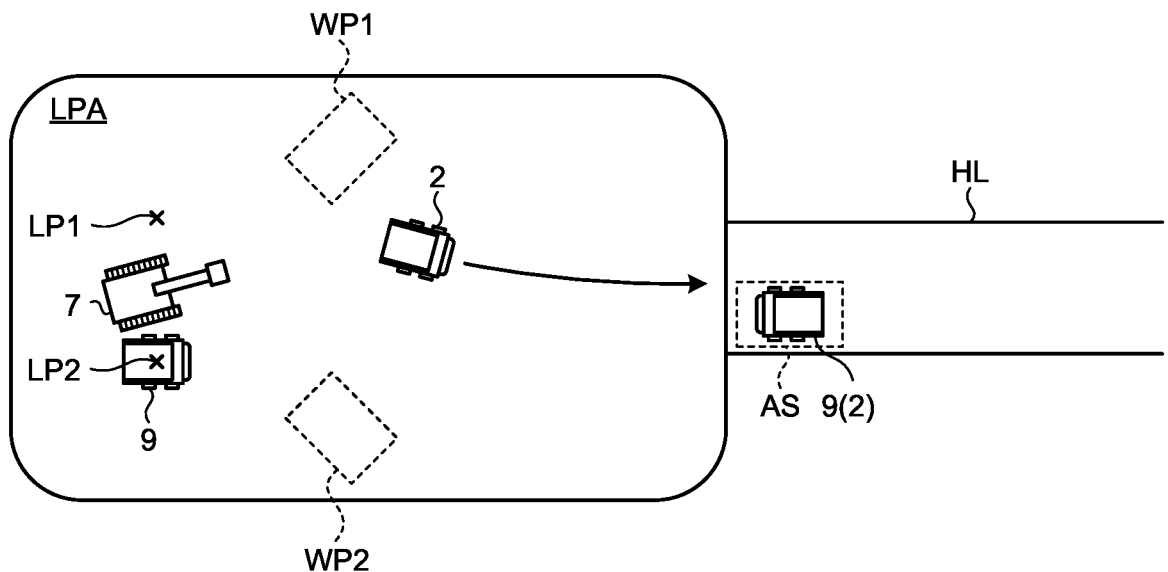
FIG. 12 is a schematic diagram illustrating an example of the management method according to the present embodiment.

In Step S6, when it is determined to cause the unmanned vehicle 2 to leave the first loading point LP1 (Step S6: Yes), the command unit 3G outputs the leaving command to the unmanned vehicle 2 (Step S7). As a result, as illustrated in FIG. 12, the unmanned vehicle 2 leaves from the first loading point LP1.

Figure 13:
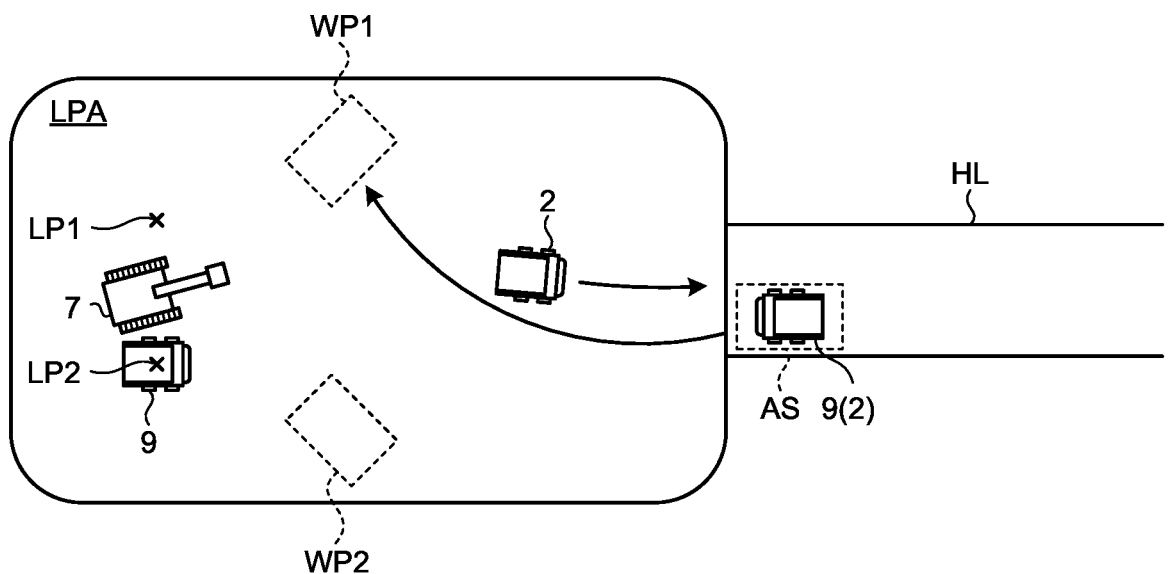
FIG. 13 is a schematic diagram illustrating an example of the management method according to the present embodiment.
Figure 14:
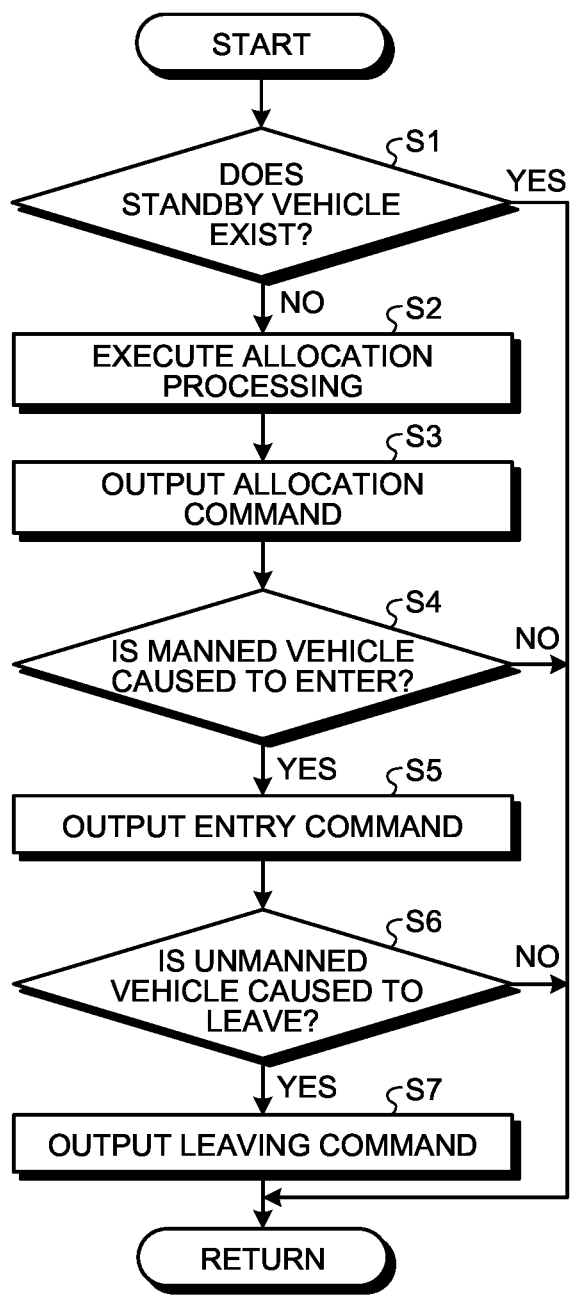
FIG. 14 is a flowchart illustrating an example of the management method according to the present embodiment.

As illustrated in FIG. 13, the next manned vehicle 9 arrives at the entry standby position AS. The first determination unit 3C determines whether or not the unmanned vehicle 2 or the manned vehicle 9 waiting for acquisition of the entry command exists (Step S1). When the unmanned vehicle 2 or the manned vehicle 9 waiting for acquisition of the entry command does not exist, the allocation execution unit 3D executes the allocation processing for the manned vehicle 9 waiting at the entry standby position AS (Step S2).

Hereinafter, the above-described processing is repeated.

Note that when the unmanned vehicle 2 is waiting at the entry standby position AS, the unmanned vehicle 2 moves to the standby position WP based on the allocation command and the work command from the command unit 3G. When the entry command is output to the unmanned vehicle 2 waiting at the standby position WP, the unmanned vehicle 2 waiting at the standby position WP enters the allocated loading position LP based on the entry command, and moves to the allocated standby position WP based on the allocation command and the work command when a new unmanned vehicle 2 is waiting at the entry standby position AS.

Note that, for example, when the loading operation on the manned vehicle 9 existing at the second loading point LP2 is completed, the driver of the loader 7 operates the input device 80 to cause the manned vehicle 9 to leave the second loading point LP2. The command unit 3G outputs the leaving command to the manned vehicle 9. As a result, the notification device 50 of the manned vehicle 9 outputs the leaving guidance data.

Case where Allocation is Suspended

Figure 15:
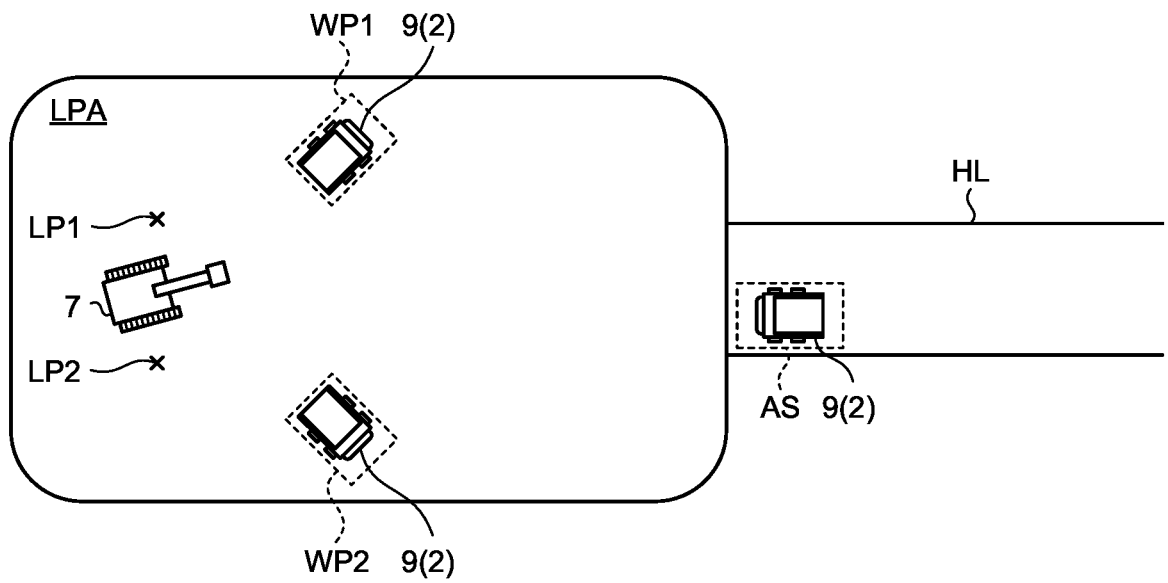
FIG. 15 is a schematic diagram illustrating an example of the management method according to the present embodiment.

FIG. 15 is a schematic diagram illustrating an example of a management method according to an embodiment. In the above-described embodiment, as illustrated in FIG. 15, when the unmanned vehicle 2 or the manned vehicle 9 waiting for acquisition of the entry command to the first loading point LP1 or the second loading point LP2 exists at all the standby positions WP, the allocation execution unit 3D suspends the allocation processing. The unmanned vehicle 2 or the manned vehicle 9 whose allocation processing is suspended waits outside the loading place LPA.

In the case of the example illustrated in FIG. 15, it is unclear at which loading point LP the loading operation is performed first, and the allocation execution unit 3D does not execute the allocation processing.

Allocation Order

Figure 16:
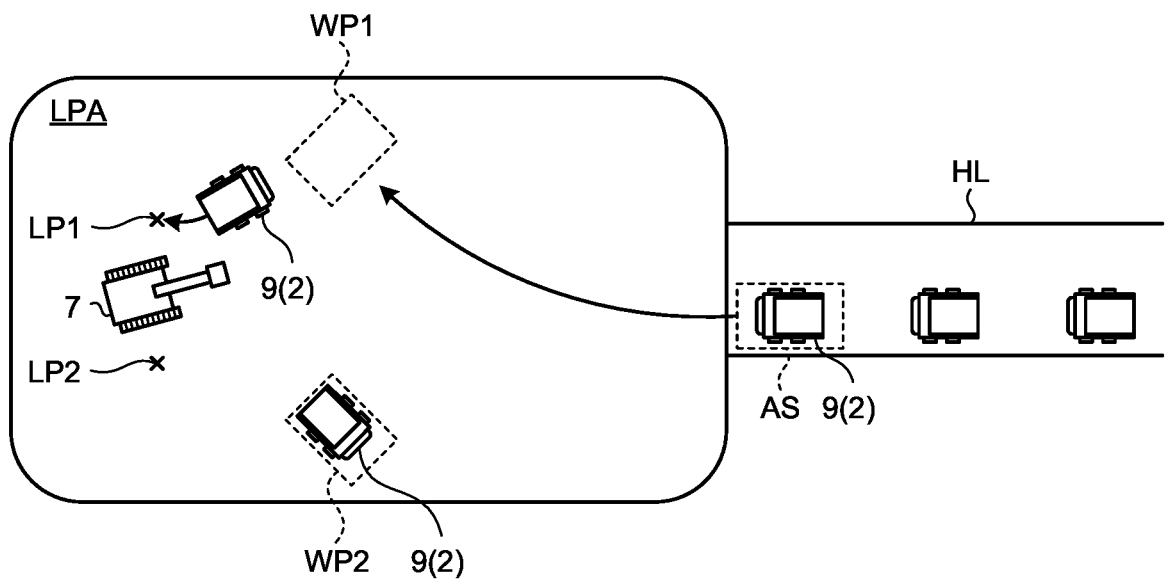
FIG. 16 is a schematic diagram illustrating an example of the management method according to the present embodiment.
Figure 17:
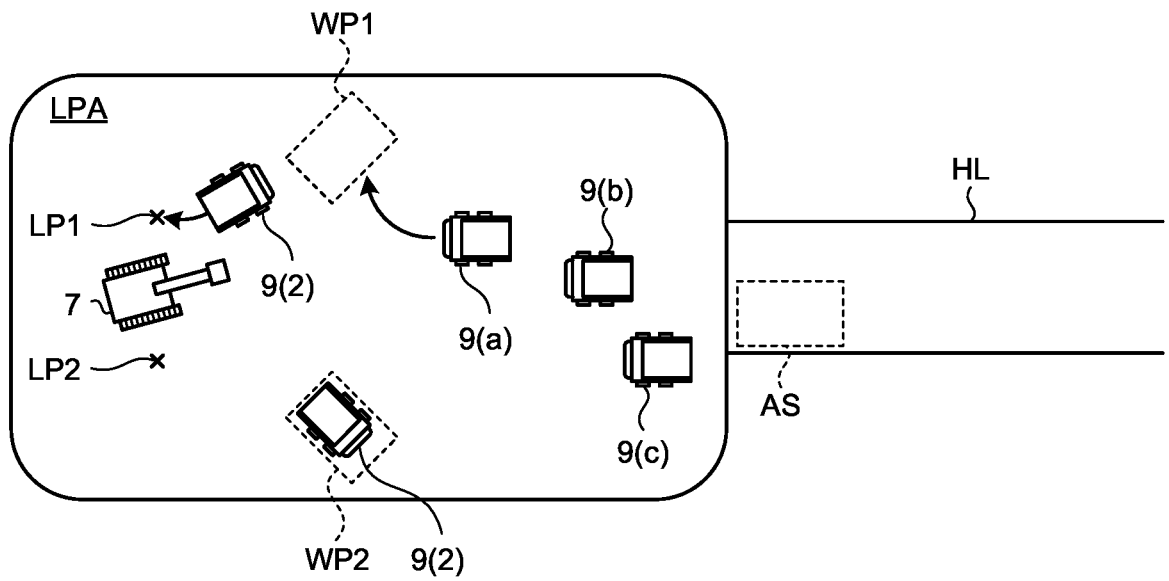
FIG. 17 is a schematic diagram illustrating an example of the management method according to the present embodiment.
Figure 18:
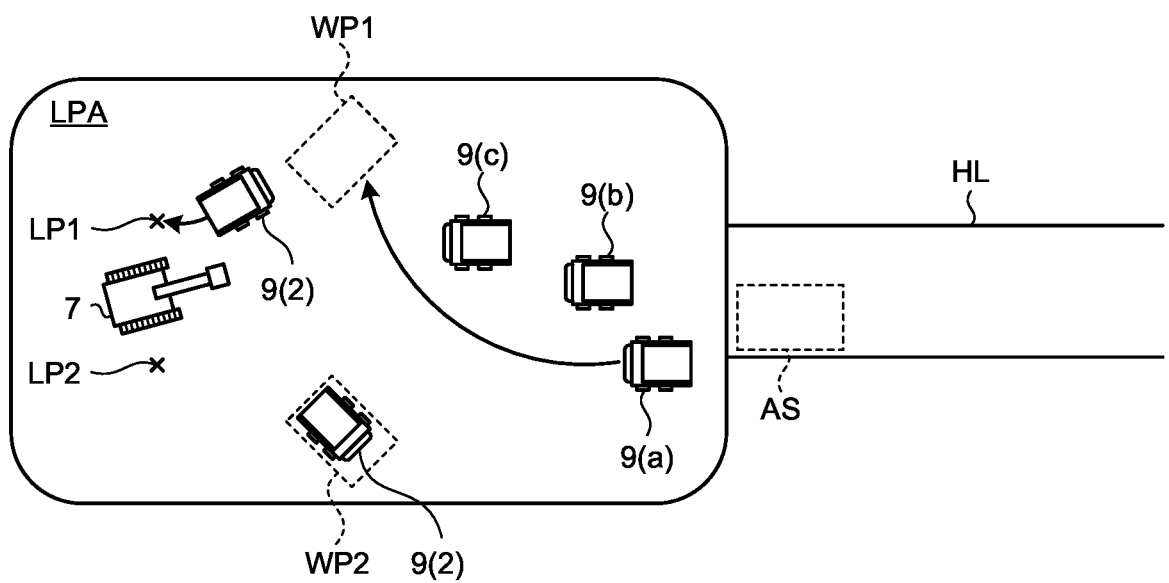
FIG. 18 is a schematic diagram illustrating an example of the management method according to the present embodiment.

FIGS. 16 to 18 are schematic diagrams illustrating examples of a management method according to an embodiment. As illustrated in FIG. 16, when a plurality of the unmanned vehicles 2 or the manned vehicles 9 waiting at the entrance of the loading place LPA exists, the allocation execution unit 3D can allocate the leading unmanned vehicle 2 or manned vehicle 9 among the plurality of unmanned vehicles 2 or manned vehicles 9 waiting at the entrance of the loading place LPA to the loading point LP.

FIGS. 17 and 18 are schematic diagrams illustrating examples of a management method when the manned vehicle 9 enters a predetermined area of the loading place. In the manned vehicle 9, according to determination of the driver of the manned vehicle 9, it is assumed that the manned vehicle 9 enters the loading place LPA and waits instead of waiting at the entrance of the loading place LPA as illustrated in FIG. 16.

As illustrated in FIG. 17, when a plurality of the manned vehicles 9 exists in a predetermined area different from the standby position WP set in the loading place LPA, the allocation execution unit 3D can allocate the predetermined manned vehicle 9 among the plurality of manned vehicles 9 existing in the predetermined area of the loading place LPA to the loading point LP. The allocation execution unit 3D can allocate, for example, the manned vehicle 9 close to the loading point LP among the plurality of manned vehicles 9 existing in the predetermined area to the loading point LP. Therefore, the manned vehicle 9 close to the loading point LP can enter the standby position WP corresponding to the allocated loading point LP.

As illustrated in FIG. 18, when the plurality of manned vehicles 9 exists in the loading place LPA, the allocation execution unit 3D can allocate the predetermined manned vehicle 9 among the plurality of manned vehicles 9 to the loading point LP. The allocation execution unit 3D can allocate, for example, the manned vehicle 9 that has first entered the loading place LPA among the plurality of manned vehicles 9 existing in the predetermined area to the loading point LP. The manned vehicle 9 that has entered first refers to the manned vehicle 9 having a long standby time. Therefore, the manned vehicle 9 that has first entered the loading place LPA can enter the standby position WP corresponding to the allocated loading point.

Note that the manned vehicle allocated to the loading point LP is not limited to a manned vehicle close to the loading point LP or a manned vehicle that has first entered the loading place LPA, and the manned vehicle 9 selected under a predetermined condition may be allocated.

Further, in the examples of FIGS. 17 and 18, for example, in a case where a vehicle is waiting at the entry standby position AS, the allocation execution unit 3D preferably allocates the loading point to a vehicle existing in a predetermined area of the loading place LPA in preference to the vehicle waiting at the entry standby position AS. In addition, the number of the manned vehicles 9 existing in the predetermined area may be one.

Computer System

Figure 19:
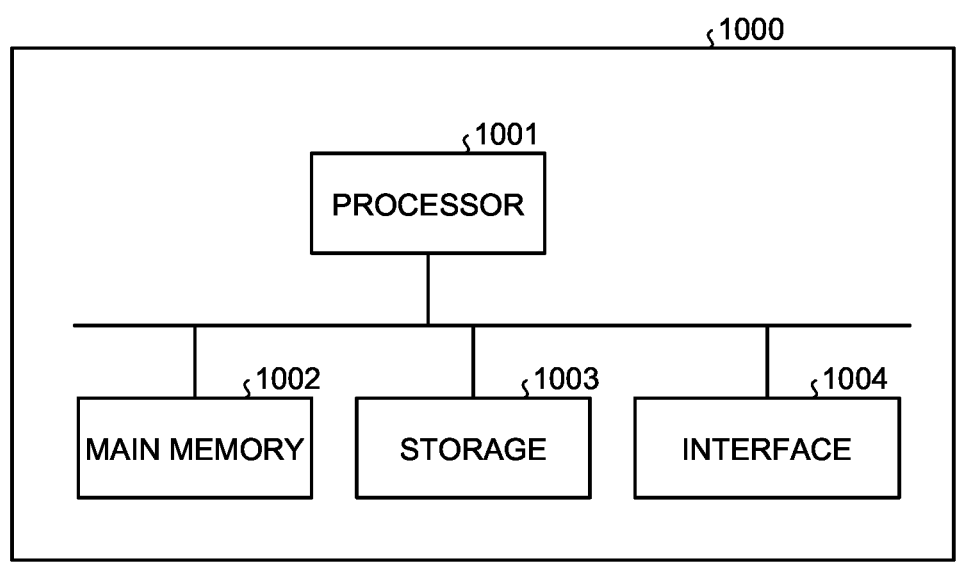
FIG. 19 is a block diagram illustrating an example of a computer system.

FIG. 19 is a block diagram illustrating an example of a computer system 1000. Each of the management device 3, the control device 30, the control device 40, and the control device 60 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. Each function of the management device 3, the control device 30, the control device 40, and the control device 60 described above is stored in the storage 1003 as a program. The processor 1001 reads a program from the storage 1003, develops the program in the main memory 1002, and executes the above-described processing according to the program. Note that the program may be distributed to the computer system 1000 via a network.

According to the above-described embodiments, the program can execute, in the computer system 1000, determining whether or not the manned vehicle 9 exists in a predetermined area of the work site, and outputting a work command to cause the unmanned vehicle 2 or the manned vehicle 9 to travel to a work point set in the work place based on a determination result.

Effects

As described above, according to the present embodiment, a work command to cause the unmanned vehicle 2 or the manned vehicle 9 to travel to a loading point, which is a work point set in a work place, is output based on the determination result as to whether the manned vehicle 9 exists in a predetermined area of a work site. As a result, even when the manned vehicle 9 enters the predetermined area of the work place in a situation where the unmanned vehicle 2 and the manned vehicle 9 operate in a mixed manner, the unmanned vehicle 2 and the manned vehicle 9 can be efficiently allocated. Even when the manned vehicle 9 exists in the predetermined area, the unmanned vehicle 2 and the manned vehicle 9 can be operated in the same manner. Therefore, a decrease in work efficiency of a loading operation is suppressed.

In addition, according to the present embodiment, the specifying unit 3F that specifies either the unmanned vehicle 2 or the manned vehicle 9 as the transporter vehicle at the work site, and the command unit 3G that outputs a work command to cause the unmanned vehicle 2 or the manned vehicle 9 to travel to a predetermined stop position based on the specification result are provided. As a result, even in a situation where the unmanned vehicle 2 and the manned vehicle 9 operate in a mixed manner, the unmanned vehicle 2 and the manned vehicle 9 can be operated in the same manner. Therefore, a decrease in work efficiency of a loading operation is suppressed.

Other Embodiments

In the above-described embodiments, at least a part of the function of the control device 30, the function of the control device 40, and the function of the control device 60 may be provided in the management device 3, and at least a part of the function of the management device 3 may be provided in the control device 30, the control device 40, and the control device 60.

In the above-described embodiments, the travel course data is generated in the management device 3, and the unmanned vehicle 2 travels according to the travel course data transmitted from the management device 3. The control device 30 of the unmanned vehicle 2 may generate the travel course data. That is, the control device 30 may include the travel course data generation unit 3A. Further, each of the management device 3 and the control device 30 may include the travel course data generation unit 3A.

In the above-described embodiments, the control device 60 transmits the input data generated by operating the input device 80 to the management device 3. The control device 60 may transmit the input data to the unmanned vehicle 2 and the manned vehicle 9 not via the management device 3. That is, the input data may be transmitted from the loader 7 to the unmanned vehicle 2 and the manned vehicle 9 by inter-vehicle communication.

In the above-described embodiments, the unmanned vehicle 2 is a dump truck which is a type of a transporter vehicle. The unmanned vehicle 2 may be a work machine including working equipment such as an excavator or a bulldozer.

In the above-described embodiments, the loader 7 performs a loading operation based on the operation of the operator riding in the operation room of the loader 7. The loader 7 may be remotely operated. When the loader 7 is remotely operated, the operator does not need to ride in the operation room of the loader 7.

In the above-described embodiments, the work command and the like are output in a both-side loading operation in which the loading point LP is set on each side of the loader 7. In a one-side loading operation in which the loading point LP is set on one side of the loader 7, the work command or the like may be output.

Note that in the one-side loading operation, there is only one loading point LP, and allocation of the loading point LP is unnecessary. Therefore, the allocation execution unit 3D may be omitted in the one-side loading operation.

In the above-described embodiments, Steps S4 and S6 are executed, but one or both of Steps S4 and S6 may not be executed as necessary. In this case, for example, the entry command or the leaving command may be output to the unmanned vehicle 2 or the manned vehicle 9 based on the input data generated by an operation of the input device 80 by the driver of the loader 7.

In the above-described embodiments, the allocation execution unit 3D allocates the first loading point LP1 as the first work point and allocates the second loading point LP2 as the second work point. However, the allocation execution unit 3D may allocate the first standby position WP1 as the first work point and allocate the second standby position WP2 as the second work point. In this case, the allocation execution unit 3D may separately output the allocation command to the standby position WP and the allocation command to the loading point LP.

In the above-described embodiments, the loader 7 is an excavator. The loader 7 may be, for example, a rope shovel or a wheel loader.

In the above-described embodiments, the work point is the loading point LP set in the loading place LPA. The work point may be a soil discharging point set in the soil discharging place DPA. The soil discharging point is a work point at which a soil discharging operation on the crusher 8 is performed. The work point may be the standby position WP set in the loading place LPA in addition to the loading point LP and the soil discharging point, and may be a preset position.

In the above-described embodiments, the command unit 3G outputs the work command to the unmanned vehicle 2 and the manned vehicle 9 based on the input data of the input device 80 operated by the operator of the loader 7. In a case where an input device is provided in the soil discharging place, the command unit 3G may output the work command to the unmanned vehicle 2 and the manned vehicle 9 based on input data of the input device in the soil discharging place.

REFERENCE SIGNS LIST

1 MANAGEMENT SYSTEM
2 UNMANNED VEHICLE
3 MANAGEMENT DEVICE
3A TRAVEL COURSE DATA GENERATION UNIT
3B OPERATING STATE ACQUISITION UNIT
3C FIRST DETERMINATION UNIT
3D ALLOCATION EXECUTION UNIT
3E SECOND DETERMINATION UNIT
3F SPECIFYING UNIT
3G COMMAND UNIT
4 COMMUNICATION SYSTEM
5 CONTROL FACILITY
6 WIRELESS COMMUNICATION DEVICE
7 LOADER
8 CRUSHER
9 MANNED VEHICLE
21 TRAVELING DEVICE
22 VEHICLE BODY
23 DUMP BODY
24 DRIVING DEVICE
25 BRAKE DEVICE
26 STEERING DEVICE
27 WHEEL
27F FRONT WHEEL
27R REAR WHEEL
28 POSITION DETECTION DEVICE
29 WIRELESS COMMUNICATION DEVICE
30 CONTROL DEVICE
40 CONTROL DEVICE
50 NOTIFICATION DEVICE
60 CONTROL DEVICE
70 WORKING EQUIPMENT
71 TRAVELING BODY
72 TURNING BODY
80 INPUT DEVICE
AS ENTRY STANDBY POSITION
CP COURSE POINT
CR TRAVEL COURSE
PA WORK PLACE
DPA SOIL DISCHARGING PLACE
LP LOADING POINT
LP1 FIRST LOADING POINT
LP2 SECOND LOADING POINT
LPA LOADING PLACE
HL TRAVEL PATH
IS INTERSECTION
WP STANDBY POSITION
WP1 FIRST STANDBY POSITION
WP2 SECOND STANDBY POSITION

The invention claimed is:

1. A management system of a work site in which an unmanned vehicle and a manned vehicle of the same vehicle type as the unmanned vehicle operate in a mixed manner, the management system of the work site comprising:
the unmanned vehicle and the manned vehicle of the same vehicle type;
a determination processor unit that determines whether or not the manned vehicle exists in a predetermined area of the work site;
a command processor unit that outputs a work command to cause the unmanned vehicle or the manned vehicle to travel to a work point set in a work place based on the determination result; and
an allocation execution processor unit which can allocate the work point to the unmanned vehicle or the manned vehicle in preference to the unmanned vehicle or the manned vehicle.

2. The management system of the work site according to claim 1, wherein
the determination processor unit determines whether or not the manned vehicle exists in the predetermined area based on a position of the manned vehicle.

3. The management system of the work site according to claim 1, further comprising:
the allocation execution processor unit that allocates the unmanned vehicle or the manned vehicle existing in the predetermined area to at least one work point set in the work place based on the determination result, wherein
the command processor unit outputs an allocation command based on the allocation result.

4. The management system of the work site according to claim 3, wherein
the allocation execution processor unit allocates a leading unmanned vehicle or manned vehicle among a plurality of the unmanned vehicles or the manned vehicles waiting at an entrance of the work place.

5. The management system of the work site according to claim 3, wherein
the allocation execution processor unit allocates the manned vehicle existing in the predetermined area in preference to the unmanned vehicle or the manned vehicle waiting at an entrance of the work place.

6. The management system of the work site according to claim 3, wherein
the allocation execution processor unit allocates the manned vehicle close to the work point among a plurality of the manned vehicles existing in the predetermined area.

7. The management system of the work site according to claim 3, wherein
the allocation execution processor unit allocates the manned vehicle having a long standby time among a plurality of the manned vehicles existing in the predetermined area.

8. The management system of the work site according to claim 1, further comprising:
a notification device that is provided in the manned vehicle and notifies the work command.

9. The management system of the work site according to claim 1, wherein
the work command includes a command to cause the unmanned vehicle to travel or guidance data to be output by a notification device of the manned vehicle.

10. A management method of a work site in which an unmanned vehicle and a manned vehicle of the same vehicle type as the unmanned vehicle operate in a mixed manner, the management method of the work site comprising:
providing the unmanned vehicle and the manned vehicle of the same vehicle type;
determining whether or not the manned vehicle exists in a predetermined area of the work site;
outputting a work command to cause the unmanned vehicle or the manned vehicle to travel to a work point set in a work place based on the determination result; and,
allocating the work point to the unmanned vehicle or the manned vehicle in preference to the unmanned vehicle or the manned vehicle.

11. A management system of a work site in which a transporter vehicle operates, the management system of the work site comprising:
an unmanned vehicle and a manned vehicle of the same vehicle type;
a specifying processor unit that specifies either the unmanned vehicle or the manned vehicle of the same vehicle type as the unmanned vehicle as the transporter vehicle;
a command processor unit that outputs a work command to cause the unmanned vehicle or the manned vehicle to travel to a predetermined stop position in a work place based on the specification result; and
an allocation execution processor unit which can allocate the predetermined stop position to the unmanned vehicle or the manned vehicle in preference to the unmanned vehicle or the manned vehicle.

12. The management system of the work site according to claim 11, wherein
the specifying processor unit specifies either the unmanned vehicle or the manned vehicle as the transporter vehicle based on vehicle data of the unmanned vehicle or the manned vehicle.

\* \* \* \* \*